United States Patent
Baumgaertner et al.

(10) Patent No.: US 10,830,338 B2
(45) Date of Patent: Nov. 10, 2020

(54) METHOD AND DEVICE FOR TRAINING AN AUTOMATICALLY OPERATING GEAR UNIT

(71) Applicant: Robert Bosch GmbH, Stuttgart (DE)

(72) Inventors: Daniel Baumgaertner, Tübingen (DE); Rinaldo Greiner, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 16/329,435

(22) PCT Filed: Aug. 2, 2017

(86) PCT No.: PCT/EP2017/069551
§ 371 (c)(1),
(2) Date: Feb. 28, 2019

(87) PCT Pub. No.: WO2018/059801
PCT Pub. Date: Apr. 5, 2018

(65) Prior Publication Data
US 2019/0195341 A1   Jun. 27, 2019

(30) Foreign Application Priority Data

Sep. 27, 2016  (DE) .......................... 10 2016 218 499

(51) Int. Cl.
*F16H 59/08*       (2006.01)
*B62M 9/123*       (2010.01)
(Continued)

(52) U.S. Cl.
CPC ............. *F16H 59/08* (2013.01); *B62M 9/123* (2013.01); *B62M 9/133* (2013.01);
(Continued)

(58) Field of Classification Search
CPC ...... F16H 59/08; F16H 59/0204; F16H 59/14; F16H 61/0213; F16H 2059/086; F16H 2061/0225; B62M 9/123; B62M 9/133
See application file for complete search history.

(56) References Cited

U.S. PATENT DOCUMENTS

| | | | |
|---|---|---|---|
| 6,047,230 A | 4/2000 | Spencer et al. | |
| 2007/0042868 A1* | 2/2007 | Fisher | B62D 1/02 482/8 |

(Continued)

FOREIGN PATENT DOCUMENTS

| | | |
|---|---|---|
| DE | 102009011882 A1 | 3/2011 |
| DE | 102014212758 A1 | 1/2016 |
| DE | 102015208248 A1 | 11/2016 |

OTHER PUBLICATIONS

International Search Report for PCT/EP2017/069551, dated Oct. 27, 2017.

*Primary Examiner* — Edwin A Young
(74) *Attorney, Agent, or Firm* — Norton Rose Fulbright US LLP; Gerard Messina

(57) ABSTRACT

A method for training an automatic gear unit of a two-wheeled vehicle and/or a device, as well as a two-wheeled vehicle having such a device modifies an existing characteristic map for the control of the gear unit based on the individual user information. Optionally, it is also possible to set up a characteristic map for the control of the gear unit with the aid of the method in that the user information is recorded during gear-change operations and utilized for further automatic gear-change operations.

9 Claims, 2 Drawing Sheets

(51) Int. Cl.
*B62M 9/133* (2010.01)
*F16H 59/02* (2006.01)
*F16H 59/14* (2006.01)
*F16H 61/02* (2006.01)

(52) U.S. Cl.
CPC ......... *F16H 59/0204* (2013.01); *F16H 59/14* (2013.01); *F16H 61/0213* (2013.01); *F16H 2059/086* (2013.01); *F16H 2061/0225* (2013.01)

(56) References Cited

U.S. PATENT DOCUMENTS

2016/0167738 A1* 6/2016 Fukao ................... F16H 61/684
 701/52
2017/0334522 A1* 11/2017 Zahid ................ H04W 12/0802

* cited by examiner

METHOD AND DEVICE FOR TRAINING AN AUTOMATICALLY OPERATING GEAR UNIT

FIELD

The present invention relates to a method and a device for training an automatically operating gear unit of a two-wheeled vehicle and to a corresponding two-wheeled vehicle.

BACKGROUND INFORMATION

In general, the driving of a vehicle requires a transmission of the drive force to an output means so that the propulsion of the vehicle is able to be accomplished. In addition to an adaptation of the drive force, a modification of the transmission ratio is also possible, e.g., with the aid of a gear unit or a transmission in general, in order to obtain a variation of the drive.

While automatic transmissions in motor vehicles have been known for quite some time, they have received more attention in the broader mass market only since the introduction of electric bicycles. In addition to the necessary control technology, the electrification of such E-bikes and Pedelecs is also more easily realizable. However, since the detection of the currently engaged gear also requires an additional and possibly complex sensor, automatic gear units for electric bicycles and also for bicycles without a drive are currently still a niche product.

German Patent Application No. DE 10 2014 212758 A1 describes a system for identifying the driver of a vehicle by acquiring operating variables of the vehicle. User profiles are stored for this purpose, which are then compared to the acquired operating variables and/or the driving behavior. This identification is able to be utilized for an individual adaptation of settings on the bicycle, e.g., the presettings for the auxiliary unit, to the driver.

A further adjustment of the gear unit as a function of user profiles for a drive-off situation is described in DE 10 2015 208248 A1. In addition to the selection of the user profile with the aid of a control element, the detection of the environment conditions or of operating variables can also be used for adjusting the gear unit.

SUMMARY

An example method according to the present invention for training an automatic gear unit of a two-wheeled vehicle and/or a device for carrying out this method as well as a two-wheeled vehicle having such a device, modifies an existing characteristic map for the control of the gear unit on the basis of the individual user information. Optionally, the present invention also makes it possible to set up a characteristic map for controlling the gear unit in that the user information is recorded during gear-change operations and used for further automatic gear-change operations.

To carry out an automatic gear-change operation in accordance with the present invention, operating variables of the two-wheeled vehicle equipped with a gear unit, such as a bicycle, are compiled to begin with. One possible (sensor) variable for deriving a desired gear change or a gear change that is meaningful from the aspect of efficiency may be the acquisition of a rotational frequency variable that represents the rotational frequency, the pedal frequency or the cadence of the pedal crank of the two-wheeled vehicle. In addition, a torque variable may be acquired, which represents the (pedal) torque applied to the crank pedal by the rider. It is furthermore necessary that the control of the gear unit acquires information pertaining to the currently engaged gear. On the basis of these or corresponding other suitable sensor variables that characterize the driving dynamics, and thus the change readiness of the gear unit, a gear-change operation of the automatic gear unit is initiated without any driver intervention. The specific control of the gear unit is implemented with the aid of a characteristic map or a database in which an allocation of the acquired sensor variables to the efficient gears is stored. In addition to the efficiency, the particular pedaling behavior of the rider of the two-wheeled vehicle may also play a role. For example, it is certainly known that more athletic bicycle riders tend to ride using higher cadences and that older bicycle riders tend to ride using lower cadences. The allocation to the engaged gears may consequently differ as a function of the utilization of the two-wheeled bicycle or the gear unit of the bicycle.

To adapt an allocation that is already set up in the form of a characteristic map or a database in the automatic gear unit, the presence of a first manual gear-change request by the rider is detected. This first manual gear-change request causes the gear unit to be switched from the already engaged gear into a first target gear. If no further gear-change request is detected, the new first target gear thus is a gear that is perceived as comfortable for the rider, which is why the allocation in the characteristic map or the database is adapted accordingly. This new allocation of the acquired sensor variables to the new first target gear may then be available for further gear-change operations within the framework of the automatic gear unit.

However, if a second manual gear-change request by the rider is detected within a predefined period of time, it should be checked whether a modification of the allocation in the characteristic map or in the database should be made nevertheless. In so doing, a distinction is to be made as to whether the second gear-change request leads to a return to the previously engaged gear or whether a switch to a new, second target gear is implemented.

If the second manual gear-change request causes a renewed change to the previously engaged gear, then this leads to the conclusion that the rider is not satisfied with the new first target gear or that this first target gear is not considered efficient. For this reason, no modification of the characteristic map or the database is provided if such a second gear-change request is present.

However, if the second manual gear-change request results in a gear change to a second target gear that differs from the previously engaged gear, then this seems to indicate that the initially selected first gear is likewise not considered efficient or pleasant by the rider. However, in order to check whether this second target gear is to be used for the modification of the characteristic map or the database, another wait for a predefined period of time takes place in order to determine whether a further gear-change request is received. Only if no further gear-change request is present will the modification be carried out using the most recently set gear.

Additional advantages result from the description of exemplary embodiments herein.

DETAILED DESCRIPTION OF EXAMPLE EMBODIMENTS

The present invention provides a method and/or a device, which individually adapt(s) the use of an automatic gear unit on a two-wheeled vehicle, such as a bicycle or an electrically drivable bicycle, to the users. Alternatively, however, it is also possible to use the introduced method or the device for setting up a separate, user-individual profile.

Figure 1:
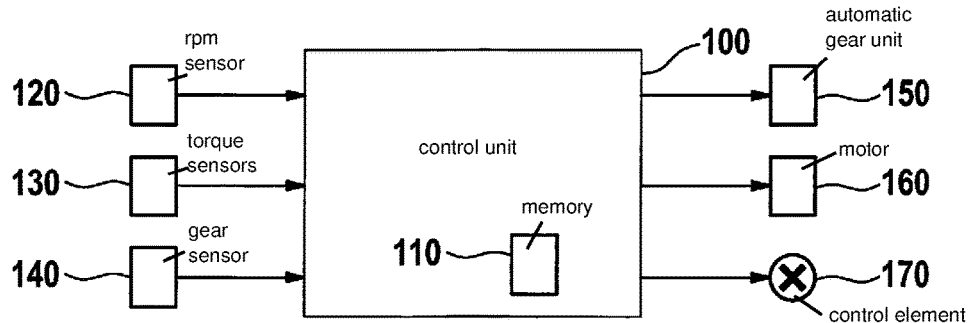
FIG. 1 schematically shows a block circuit diagram of a control unit according to the present invention.

A device 100 as it is schematically illustrated in FIG. 1 is provided for the execution of the example method according to the present invention. This device 100, e.g., a control unit, acquires the rotational frequency of the rider in the form of a rotational frequency variable N. Such rotational frequency variables are typically acquired by an rpm sensor 120 at the cranks of a bicycle. In addition, a rider torque in the form of a torque variable M is acquired. Torque sensors 130 are typically employed for such a purpose, which are mounted in the pedal axle or on the pedals of the pedal crank. Finally, a suitable sensor 140 senses gear n currently engaged by the automatic gear unit. As an alternative to sensor 140, it is possible to utilize an internal evaluation of the automatic gear unit in which the currently engaged gear n is noted.

The control of automatic gear unit 150 is carried out on the basis of the acquired sensor variables N, M and n as well as stored values for the allocation of these sensor variables to a preferred gear in a characteristic map or a data base in memory 140. However, it is explicitly pointed out that it is also possible to acquire appropriate other sensor variables which may form the basis for deriving a gear-change behavior of the automatic gear unit.

It may optionally be provided that the acquired sensor variables may also be used for the control of motor 160, e.g., for taking into account the actuation of a gear unit in the motor which is able to assume the function of an automatic gear unit. In addition, the display of a gear-change recommendation and an imminent or an executed gear-change operation on a display or a control element 170 is provided.

Figure 2:
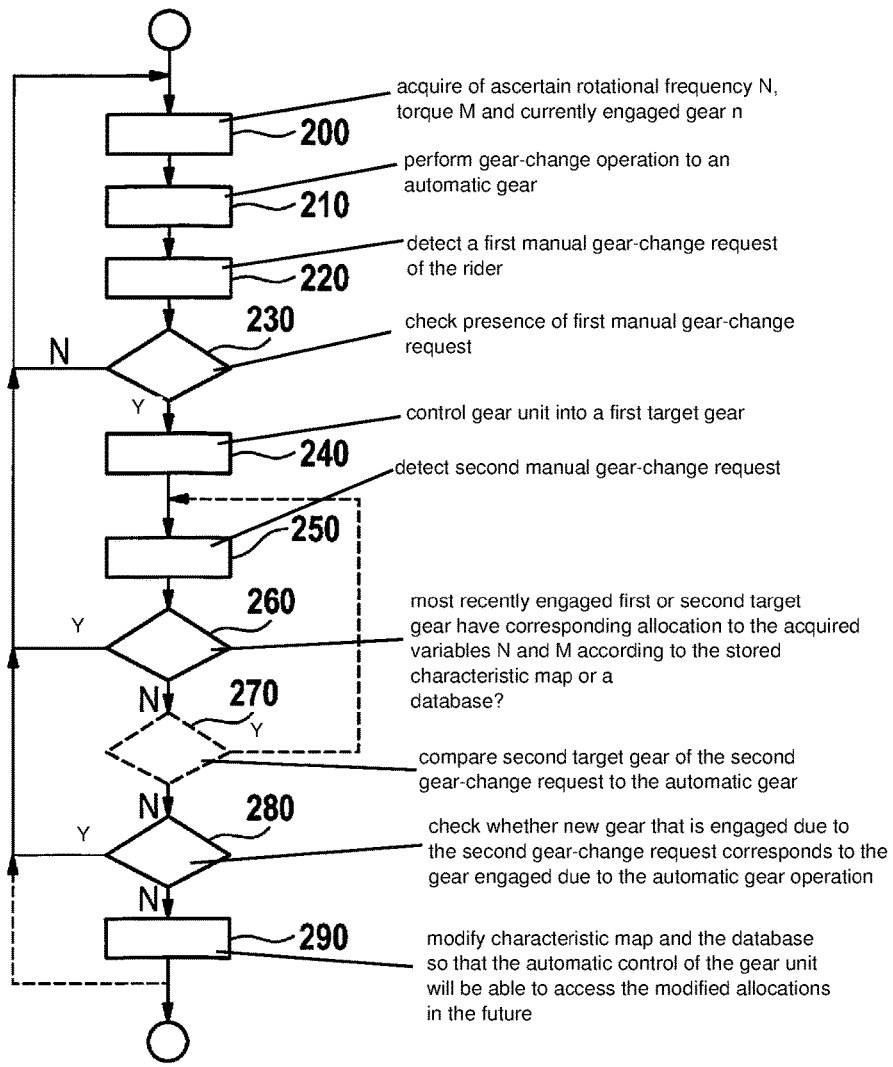
FIG. 2 shows an example method according to the present invention based on a flow diagram.

Using the flow diagram of FIG. 2, the method according to the present invention will be described using a preferred exemplary embodiment. To begin with, rotational frequency N, (rider) torque M as well as the currently engaged gear n are acquired or ascertained in a step 200. A gear-change operation of the automatic gear unit is then carried out based on the acquired (sensor) variables N, M and n and a characteristic map or a database. As previously described, it is also possible to use other operating variables that are able to initiate the gear-change operation in steps 200 and 210. In the following step 220, a first manual gear-change request of the rider is detected, which overrides or bridges the automatic gear. For example, this may be accomplished in such a way that the method according to the present invention will be continued only until a first manual gear-change request is detected while the method for the control of the automatic gear unit simultaneously continues to run independently or the presence of this first manual gear-change request is checked in a next step 230. As long as no first manual gear-change request is received, the automatic gear change is started in step 200 upon a renewed detection of the variables N, M and n, for example, that are relevant in this context.

However, if the present method detects in step 230 that a first manual gear-change request is present, then the gear unit is controlled into a first target gear in step 240 in order to carry out this gear-change request. Subsequently, another detection takes place in order to check whether the rider outputs a further, second manual gear-change request. This detected second manual gear-change request is also promptly implemented in step 250 in the form of a gear-change operation of the gear unit into a second target gear. During this detection in step 250, a wait for a predefined period of time, e.g., 2 or 4 seconds, takes place before a transition to next step 260. In this step 260 it is checked whether the most recently engaged first or second target gear has a corresponding allocation to the acquired (sensor) variables N and M according to the stored characteristic map or the database. If this is the case, then the automatic gear operation is repeated with step 200. If no corresponding allocation is present in step 260, a check takes place in step 280 as to whether the new gear that is engaged due to the second manual gear-change request corresponds to the gear engaged due to the automatic gear operation in step 210. If this is the case, the down-shifting by the rider seems to indicate that the original, automatically engaged gear was more pleasant or more efficient for the rider. In such a case, the characteristic map will not be modified and the present method is run through again by step 200. However, if no second manual gear-change request is detected in step 250, then it may be assumed that the rider desires a change to the new first target gear also in the future when the acquired sensor variables for N and M are detected. The characteristic map and the database are therefore modified accordingly in following step 290 so that the automatic control of the gear unit will be able to access the modified allocations in the future. The method may then be terminated or run through again starting with step 200.

In one optional embodiment, it may be provided that a check takes place, for instance following step 260, in order to ascertain whether the second target gear engaged in step 250 due to the second gear-change request corresponds to the gear engaged by the automatic gear unit in step 210. If this is the case, then the method continues with step 280. In the other case, it is detected that the rider not only considers the gear originally engaged by the automatic gear unit as unpleasant and/or not efficient but also the initially selected first target gear. As a result, when a further engaged gear is detected, the present method is run through again with step 250 in order to check whether this newly selected second target gear is maintained. The predefined period of time provided for the detection in step 250 then starts anew from the beginning.

Figure 3:
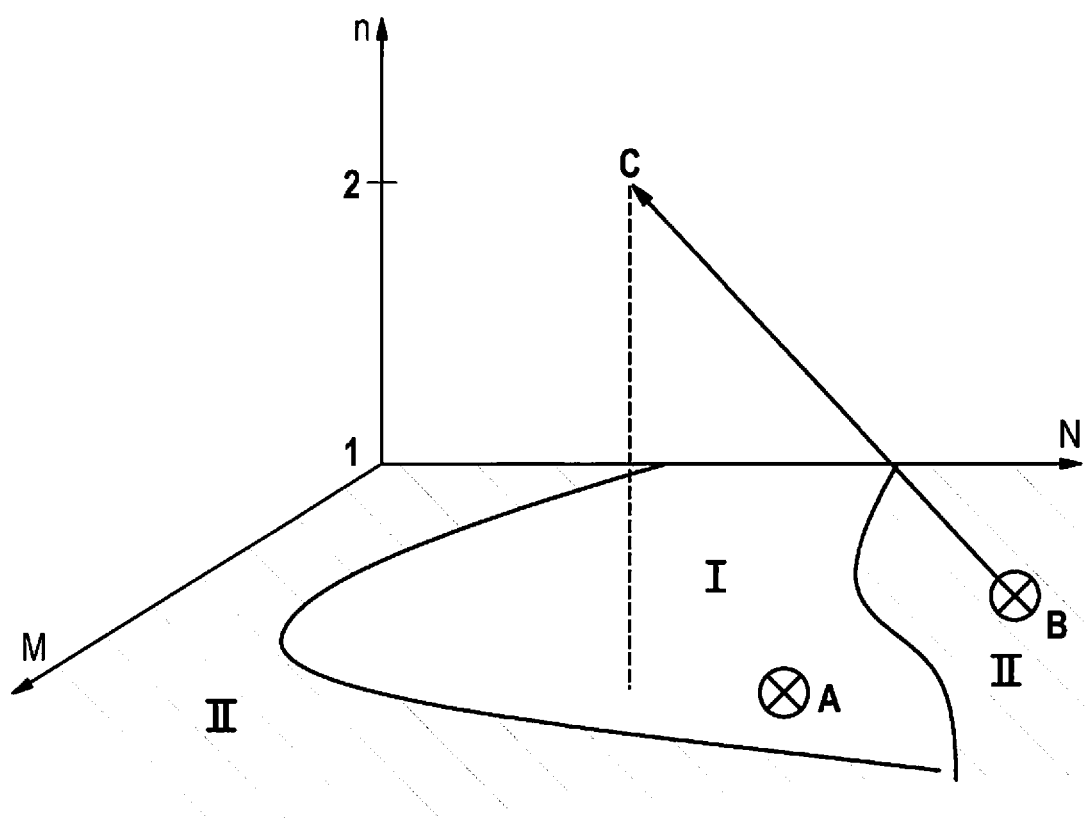
FIG. 3 shows a graphical representation of a characteristic map based on the pedal frequency; the pedal torque of the rider and the engaged gear.

With the aid of the schematic illustration of a possible characteristic map for the control of the automatic gear unit according to FIG. 3, the behavior of a gear-change operation is able to be shown by way of example. In the three-dimensional illustration of rotational frequency N, torque M, and gear n, two ranges I and II exist for each gear. While range I represents a ratio of rotational frequency N and torque II that is considered efficient for the system or the (automatic) gear unit and/or pleasant for the rider, range II represents conditions under which a gear-change operation may or should be initiated. Therefore, if the system or the automatic gear unit were to identify a ratio of N to M according to point A, no gear-change operation would be initiated. However, at a ratio of these (sensor) variables in point B, the system or the (automatic) gear unit would make a gear-change recommendation to a new gear (N=2) or automatically carry it out. Because of the change to another gear, the rotational frequency/pedal frequency/cadence N as well as the (pedal) torque M of the rider change(s) according to point C, so that the new ratio in the changed gear lies in range I again. Because the system or the (automatic) gear unit detects that originally not envisioned ratios or ranges in the characteristic map lead to a manual gear-change operation by the rider, the system is able to adapt the characteristic map in a self-training manner to the individual user behavior, which is available for further gear-change operations.

In general, the above method may also be utilized to detect the gear-change ranges by the rider and to set up the characteristic map on its own with the aid of a suitable number of gear-change operations. A slightly modified method according to FIG. 2 may be used in this case in that no gear-change operation based on a characteristic map is carried out in the beginning. Instead, it is checked whether a selected gear is used long enough to generate a first range in a characteristic map. Subsequently, using the method according to FIG. 2, the characteristic map or a database of this kind may be generated or expanded.

In one further exemplary embodiment, it may also be provided that it is detected that different riders are using the two-wheeled vehicle based on the individual operational information. Toward this end, an individual characteristic map may be set up and used for each user. Reference to corresponding methods for detecting different riders was made at the outset.

What is claimed is:

1. A method for training an automatic gear unit of a two-wheeled vehicle, the method comprising:
   acquiring at least: (i) a first rotational frequency variable representing a rotational frequency of a pedal crank of the two-wheeled vehicle, (ii) a torque variable representing a torque applied by a rider to the pedal crank, and (iii) an engaged gear of an automatic gear unit; and
   performing a gear-change operation to an automatic gear as a function of the first rotational frequency variable, the torque, and the engaged gear with the aid of a characteristic map;
   detecting a first manual gear-change request of the rider;
   performing a gear-change operation to a first target gear as a function of the gear-change request; and
   modifying the characteristic map by allocating the first target gear to the acquired rotational frequency variable and to the acquired torque.

2. The method as recited in claim 1, further comprising:
   detecting a second manual gear-change request following the first manual gear-change request by the rider during a predefined period of time; and
   modifying the characteristic map as a function of an elapsing of the predefined period of time without a detection of the second manual gear-change request.

3. The method as recited in claim 2, further comprising:
   comparing a second target gear of the second gear-change request to the automatic gear, a renewed detection of the second manual gear-change request of the rider during the predefined period of time taking place if the second target gear does not correspond to the automatic gear.

4. The method as recited in claim 1, further comprising:
   detecting a second manual shift gear-change request of the rider during a predefined period of time; and
   comparing a second target gear of the second gear-change request to the automatic gear, a modification of the characteristic map being prevented if the second target gear corresponds to the automatic gear.

5. A device for training an automatic gear unit of a two-wheeled vehicle having a control unit and a memory, the control unit configured to:
   acquire: (i) a first rotational frequency variable representing a rotational frequency of a pedal crank of the two-wheeled vehicle, (ii) a torque variable representing a torque applied to the pedal crank by a rider, and (iii) an engaged gear of the gear unit;
   generate a control signal for carrying out a gear-change operation to an automatic gear as a function of the rotational frequency variable, the torque, and the engaged gear based on a characteristic map stored in the memory;
   detect a first manual gear-change request by the rider;
   generate a further control signal for carrying out a gear-change operation to a first target gear as a function of the gear-change request; and
   modify the characteristic map in the memory by allocating the first target gear to the acquired rotational frequency variable and the acquired torque.

6. The device as recited in claim 5, wherein the control unit is further configured to:
   detect a second manual gear-change request following the first manual gear-change request by the rider during a predefined period of time; and
   modify the characteristic map as a function of an elapsing of the predefined period of time without detecting the second manual gear-change request.

7. The device as recited in claim 6, wherein the control unit is configured to:
   carry out a comparison of a second target gear of the second gear-change request with an automatic gear, and a renewed detection of the second manual gear-change request of the rider during the predefined period of time takes place if the second target gear does not correspond to the automatic gear.

8. The device as recited in claim 5, wherein the control unit is further configured to:
   detect a second manual gear-change request by the rider during a predefined period of time, and
   carry out a comparison of a second target gear of the second gear-change request and the automatic gear, a modification of the characteristic map being prevented if the second target gear corresponds to the automatic gear.

9. A two-wheeled electrically drivable bicycle, comprising:
   an automatic gear unit; and
   a device for training the automatic gear unit of a two-wheeled bicycle, the device having a control unit and a memory, the control unit configured to:
      acquire: (i) a first rotational frequency variable representing a rotational frequency of a pedal crank of the two-wheeled bicycle, (ii) a torque variable representing a torque applied to the pedal crank by a rider, and (iii) an engaged gear of the automatic gear unit;
      generate a control signal for carrying out a gear-change operation to the automatic gear as a function of the rotational frequency variable, the torque, and the engaged gear based on a characteristic map stored in the memory;
      detect a first manual gear-change request by the rider;
      generate a further control signal for carrying out a gear-change operation to a first target gear as a function of the gear-change request; and
      modify the characteristic map in the memory by allocating the first target gear to the acquired rotational frequency variable and the acquired torque.

* * * * *